(12) United States Patent
Kim et al.

(10) Patent No.: US 7,660,230 B2
(45) Date of Patent: Feb. 9, 2010

(54) M-ARY ORTHOGONAL CODED/BALANCED UWB TRANSMITTED REFERENCE SYSTEMS

(75) Inventors: Dong In Kim, Burnaby (CA); Tao Jia, Burnaby (CA); Kyung Sup Kwak, Incheon (KR)

(73) Assignees: Simon Fraser University, Burnaby (CA); Inha-Industry Partnership Institute, Incheon (KR)

( * ) Notice: Subject to any disclaimer, the term of this patent is extended or adjusted under 35 U.S.C. 154(b) by 579 days.

(21) Appl. No.: 11/426,027

(22) Filed: Jun. 23, 2006

(65) Prior Publication Data

US 2007/0237065 A1 Oct. 11, 2007

(30) Foreign Application Priority Data

Apr. 10, 2006 (KR) .................. 10-2006-0032284

(51) Int. Cl.
*H04J 11/00* (2006.01)
(52) U.S. Cl. .................. 370/203; 375/138; 375/140; 375/340
(58) Field of Classification Search .................. 370/204, 370/205, 207
See application file for complete search history.

(56) References Cited

U.S. PATENT DOCUMENTS

| | | | |
|---|---|---|---|
| 6,810,087 B2 | 10/2004 | Hoctor et al. | ................ 375/259 |
| 7,469,128 B2 * | 12/2008 | Pastemak et al. | .............. 455/86 |
| 7,496,128 B2 * | 2/2009 | Giannakis et al. | ........... 375/138 |
| 2003/0165184 A1 * | 9/2003 | Welborn et al. | ............. 375/146 |
| 2005/0013390 A1 * | 1/2005 | Tufvesson | .................... 375/340 |
| 2005/0094719 A1 * | 5/2005 | Young | ......................... 375/222 |

OTHER PUBLICATIONS

Dong, X. et al, "A New UWB Dual Pulse Transmission and Detection Technique"; IEEE; 2005; pp. 2835-2839.

* cited by examiner

*Primary Examiner*—Chi H. Pham
*Assistant Examiner*—Shick Hom
(74) *Attorney, Agent, or Firm*—Brown & Michaels, PC

(57) ABSTRACT

A novel transceiver structure is proposed to increase the achievable data rate for ultra wideband transmitted reference (UWB-TR) systems. For every $N_s$ pulse pairs during one symbol transmission, the data pulses are weighted by one of the M-ary orthogonal sequences, thus carrying additional $\log_2$ M-bit information. Furthermore, by utilizing a pair of balanced matched filters before the cross correlator, the minimum separation between the reference and data pulses is significantly reduced without causing any inter-pulse interference (IPI), which in turn reduces the minimum required frame length in order to avoid the inter-frame interference (IFI). As a result, the invented TR system can achieve higher data rates than the conventional TR system, while maintaining superior bit-error-rate (BER) performance even with lower transmit power.

13 Claims, 8 Drawing Sheets

M-ARY ORTHOGONAL CODED/BALANCED UWB TRANSMITTED REFERENCE SYSTEMS

I. BACKGROUND OF THE INVENTION

1. Field of Invention

The present invention relates generally to ultra wideband (UWB) communication systems. More specifically, it relates to the transmission, reception and detection of impulse radio signals in a transmitted reference (TR) system.

2. Background of Related Art

Ultra Wideband (UWB) technology has been proposed as a promising physical layer candidate for the short-range high-data-rate indoor wireless communications. By the low-duty-cycle transmission of short pulses with a pulse width on the order of sub-nanoseconds, it allows to minimize the power consumption at the radio units and provides fine multipath resolvability. The latter is especially desirable for indoor wireless communications where the channel exhibits dense multipath characteristic.

However, the fine multipath resolvability also provides challenges to the design of a low-complexity and low-cost UWB receiver. To fully collect the signal energy spreaded over all the multipath components (MPCs), a commonly-used Rake receiver has to implement tens or even hundreds of correlation branches. On the other hand, using only a subset of MPCs, notably selective or partial Rake, sacrifices the signal energy for a moderate-complexity implementation of the receiver. In addition, the Rake receiver requires channel estimation to combine the MPCs, which further increases the receiver complexity as the number of MPCs grows.

For the above reasons, much attention has been directed to the use of transmitted reference (TR) system. One such UWB-TR system is disclosed in the U.S. patent "Ultra-Wideband Communications System", numbered as U.S. Pat. No. 6,810,087 B2. As disclosed therein, an unmodulated reference pulse is transmitted before each data-modulated pulse to provide an immediate channel estimation for detecting the data bit modulated on the data pulse. In order for the two pulses to experience the same channel condition, the time separation between the two pulses should be less than the channel coherence time. The TR receiver first correlates the reference pulse with its associated data pulse. In the output of the correlator, each MPC results in a peak and all peaks share the same polarity determined by the modulated data bit. By integrating the correlator output for a certain time interval, the signal energy spreaded over the MPCs is coherently added and then used to detect the modulated data bit. Compared to the Rake receiver, the TR scheme does not require channel estimation and it is suitable in dense multipath environments with manageable receiver complexity. However, these benefits are achieved at the expense of power inefficiency by sending the reference pulse and noise enhancement due to the noisy reference, where the latter results in large noise-times-noise terms which degrade the detection performance severely at the low or medium signal-to-noise ratio (SNR) range. In addition, to avoid the inter-pulse interference (IPI) between the reference and data pulses, the time separation between them has to be at least equal to the channel delay spread, which indicates a loss in the data rate.

In order to improve the detection performance of the TR system, most approaches in the prior art focus on getting a better template signal through noise averaging prior to the correlation. Notable among them is a hybrid matched filter correlation receiver, disclosed in the U.S. patent application Publication Number US 2005/0013390 A1, titled as "Hybrid UWB receiver with matched filters and pulse correlator". As disclosed, by applying a symbol-rate matched filter before the cross correlator, the receiver not only achieves noise-averaging but also allows the subsequent digital processing to operate at the symbol rate rather than the frame rate, making it superior to prior TR schemes. However, this scheme, referred to as conventional TR hereafter, and other prior art TR schemes, are susceptible to the IPI occurred when the reference and data pulses are separated by a distance less than the channel delay spread. As a result, the achievable data rate is much limited. To deal with this, there is one proposal based on maximum-likelihood template estimation in the presence of IPI. However, it is too expensive to implement.

Therefore, there exists a need for a low-complexity UWB-TR system that is not subject to the IPI, and more suitable for high-data-rate communications.

II. BRIEF SUMMARY OF THE INVENTION

According to the invention there is provided an UWB-TR system for transmitting, receiving and detecting impulse radio signals. The invented system includes a transmitter for modulating the information bits to be sent, and a receiver for detecting those information bits from the received signals communicated through the wireless channel.

The transmitter transmits a pair of pulses in each frame, in which the first pulse is an unmodulated reference pulse and the second is a data-modulated pulse separated from the reference pulse by a time interval of $T_d$. One information bit is modulated by the polarity difference between the reference and data pulses and $N_s$ such pulse pairs are transmitted for each information bit, where $N_s$ is an even number. In addition, the $N_s$ data pulses are weighted by one of the M-ary orthogonal sequences indexed by additional $\log_2 M$ information bits. Hence, $(1+\log_2 M)$ bits are sent during each symbol transmission. The orthogonal sequences are designed such that each of these sequences has equal numbers of +1 and −1.

At the receiver, the received signal first passes through a bank of M+1 matched filters. By designing the M-ary orthogonal codes and the impulse responses of these matched filters in a joint manner, the output of these filters will be IPI-free. The output of the first matched filter is delayed by $T_d$, multiplied with the outputs of the other M matched filters and integrated over a certain time interval to yield M decision variables. A detector then decodes all the $(1+\log_2 M)$ information bits once using the decision variable with the largest absolute value.

The UWB-TR system summarized above has several advantages over prior art TR systems. Firstly, by jointly designing the signaling and matched filters, the IPI resulted from an overlap of multipath-delayed pulses is fully eliminated at the outputs of the matched filters. Therefore, the separation between the reference and data pulses can be significantly reduced without degrading the detection performance. This will in turn reduce the minimum required frame length to avoid the inter-frame interference (IFI), indicating increased data rates. Secondly, a novel M-ary orthogonal modulation has been incorporated to further increase the data rate. Finally, compared to the TR scheme based on the maximum likelihood template estimator to combat IPI, the present invention has a much lower complexity and lower cost to be implemented. During the final stage of our preparation of this application, we are informed of another proposal by Dong et al., "A new UWB dual pulse transmission and detection technique," *IEEE International Conference on Communications*, May 2005, where the proposed approach can be viewed as only one special case of the present invention.

In summary, by allowing the reference and data pulses to be separated by a smaller time interval as well as by sending additional $\log_2 M$ information bits per symbol transmission, the invented "M-ary orthogonal coded/Balanced TR" system achieves higher data rates than the conventional TR system, while maintaining the same bit-error-rate (BER) performance even with lower transmit power. On the other hand, with the same transmit power, the invented system can achieve better BER performance, if the separation between the reference and data pulses has to be less than the channel delay spread as required by high-data-rate communications.

III. BRIEF DESCRIPTION OF THE DRAWINGS

The novel features of the invention will be best understood by referring to the detailed description which follows in conjunction with the accompanying drawings wherein.

IV. DETAILED DESCRIPTION OF THE INVENTION

Disclosed below is an effective solution to suppress the IPI between the reference and data pulses, thus increase the data rate for UWB-TR systems, with only slightly increased receiver complexity.

Figure 1:
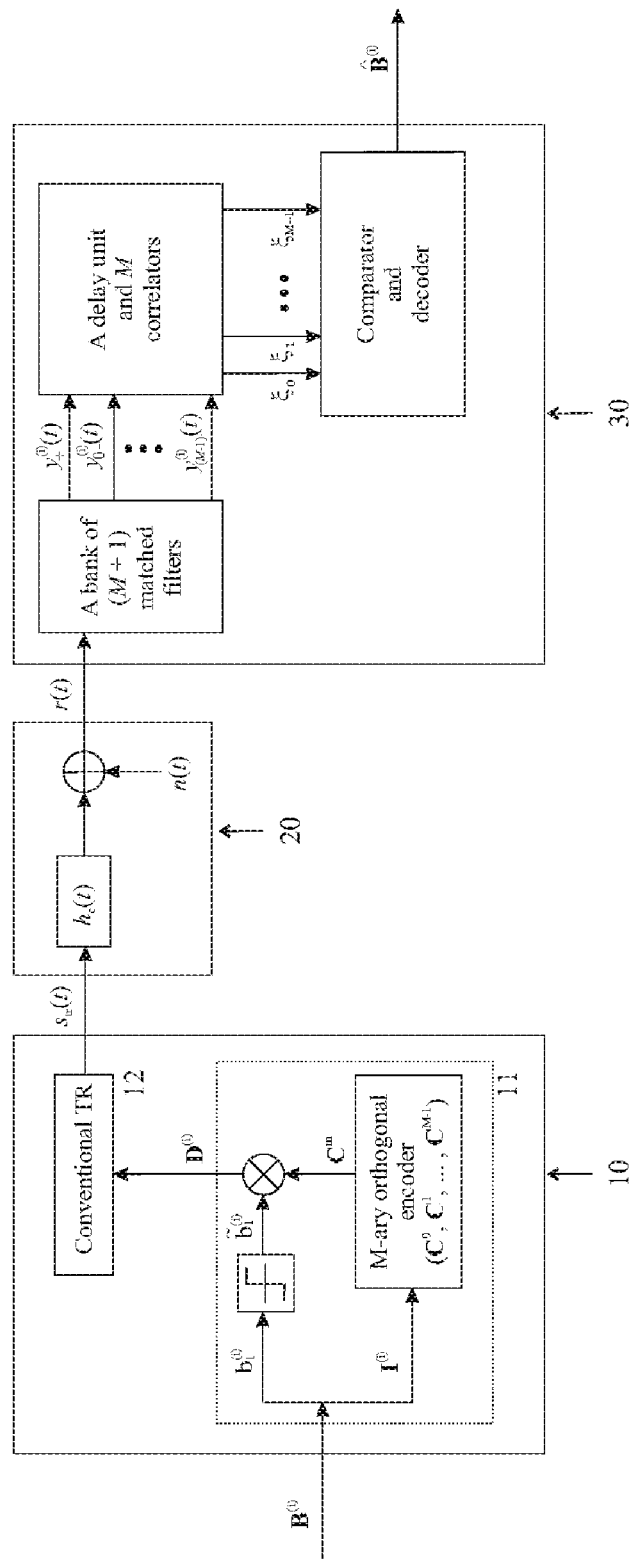
FIG. 1 is a block diagram of M-ary orthogonal coded/Balanced TR system.
Figure 2:
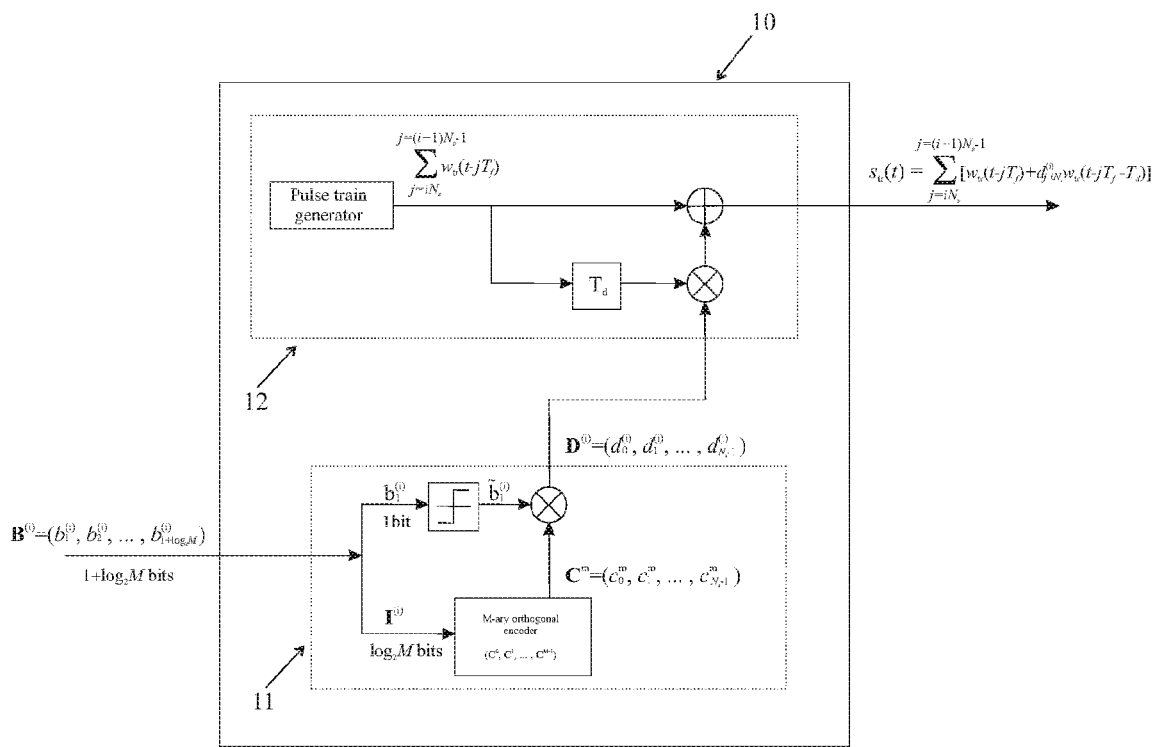
FIG. 2 is a block diagram of the transmitter.

The block diagram of the invented system is shown in FIG. 1, which consists of three components: the transmitter 10, the communication channel 20 and the receiver 30. In the transmitter 10, whose block diagram is shown in FIG. 2, $B^{(i)}$ is the ith symbol including $1+\log_2 M$ data bits, denoted by $B^{(i)} = (b_1^{(i)} b_2^{(i)} \ldots b_{\log_2 M+1}^{(i)})$ where $b_n^{(i)} \in \{0, 1\}$ for $n=1, 2, \ldots, \log_2 M+1$. At the M-ary orthogonal encoder 11, the $\log_2 M$ bits, denoted by $I^{(i)}=(b_2^{(i)} b_3^{(i)} \ldots b_{\log_2 M+1}^{(i)})$, are used to select one of the M-ary orthogonal codes. The index of the selected code, denoted by m, is determined by $$(m)_2=(b_2^{(i)} b_3^{(i)} \ldots b_{\log_2 M+1}^{(i)}) \qquad (1)$$

Here $(\cdot)_x$ denotes base x. The selected orthogonal code is an $N_s$-element vector, defined by $C^m=(c_0^m c_1^m \ldots c_{N_s-1}^m)$ where $c_n^m \in \{+1, -1\}$ for $n=0, 1, \ldots, N_s-1$. The signaling format and the orthogonal codes are designed to meet the following two criterions:

i) the number of frames per symbol, $N_s$, should be an even number and the numbers of +1 and −1 in each code vector should be equal, i.e., $N_s/2$ elements are +1 and $N_s/2$ are −1;

ii) the M-ary codes are orthogonal to each other, i.e., $$\sum_{n=0}^{N_s-1} c_n^m c_n^k = 0 \text{ for } m \neq k \text{ where } m, k \in \{0, 1, \ldots M-1\}$$

Note that if M=1, there is no code selection. In this case, we use a fixed code which meets the first criterion for all the symbol transmissions. The specific reasons for these two design criterions will be explained later when we describe the proposed receiver structure. By multiplying $C^m$ with $\tilde{b}_1^{(i)}$, which equals to +1 if $b_1^{(i)}=1$ and −1 if $b_1^{(i)}=0$, we will get an $N_s$-element vector $D^{(i)}=(d_0^{(i)} d_1^{(i)} \ldots d_{N_s-1}^{(i)})$, where $d_n^{(i)}= \tilde{b}_1^{(i)} \cdot c_n^m$ for $n=0, 1, \ldots, N_s-1$. $D^{(i)}$ is then fed to a commonly-used TR transmitter 12. The transmitter 12 generates $N_s$ pulse pairs for each symbol transmission. The $N_s$ elements of $D^{(i)}$ determine the polarities of the data pulses in these $N_s$ pulse pairs, respectively. The transmitted signal for ith symbol $B^{(i)}$ can be expressed as $$s_{tr}(t) = \sqrt{\frac{E_s}{2N_s}} \sum_{j=iN_s}^{(i+1)N_s-1} [w_{tr}(t-jT_f) + d_{j-iN_s}^{(i)} w_{tr}(t-jT_f-T_d)], \qquad (2)$$

where $w_{tr}(t)$ is the transmitted pulse with a pulse width of $T_w$, equal to the chip time $T_c$. $T_f$ is the frame time in which said pulse pair is transmitted. $T_d$ is the time separation between the reference and data pulses. $E_s$ is the energy used for transmitting one symbol. In addition, a random polarity-shift can be applied to the pulse pairs to better shape the transmit spectrum according to FCC rules, but will not be described here.

While one data bit is being transmitted using $N_s$ pulse pairs as in the conventional TR system, additional $\log_2 M$ data bits are transmitted simultaneously. As a result, the total data rate has been increased to $$R_s=(1+\log_2 M)R_b, \qquad (3)$$

compared to the data rate $R_b=1/(N_s T_f)$ achievable by the conventional TR scheme.

The transmitted signal $s_{tr}(t)$ then passes through the communication channel 20 in FIG. 1. The resulting received signal is $$r(t)=s_{rec}(t) \otimes h_c(t)+n(t), \qquad (4)$$

where $s_{rec}(t)$ has included the effect of the receiver antenna as a time-domain differentiator on $w_{tr}(t)$, resulting in $w_{rec}(t)$. n(t) is the additive white Gaussian noise (AWGN). $\otimes$ denotes the convolution operation and $h_c(t)$ is the multipath channel, which can be expressed as the following tapped-delay-line model $$h_c(t) = \sum_{l=0}^{L-1} a_l \delta(t-lT_c). \qquad (5)$$

Here, $a_l$ is the sum of the gain coefficients of the multipath components (MPCs) arrived within the time interval $[lT_c, (l+1)T_c)$ and there are totally L such time intervals. Equivalently, the channel delay spread is given by $T_m=LT_c$.

As can be seen from (2) and (4), to ensure there is no inter-frame interference (IFI) between the signals in two consecutive frames, we assume $T_f > T_d + T_m$. Furthermore, if the time separation between the reference and data pulses $T_d$ is less than the channel delay spread $T_m$, the IPI will occur due to multipath. In the conventional TR system, it will degrade the detection performance at the receiver. However, using the invented TR scheme, the IPI can be fully eliminated in a deterministic way. In the following paragraphs, we will demonstrate how this is achieved through our joint signaling and receiver design as well as elaborate the related design rules and complexity issues.

Figure 3:
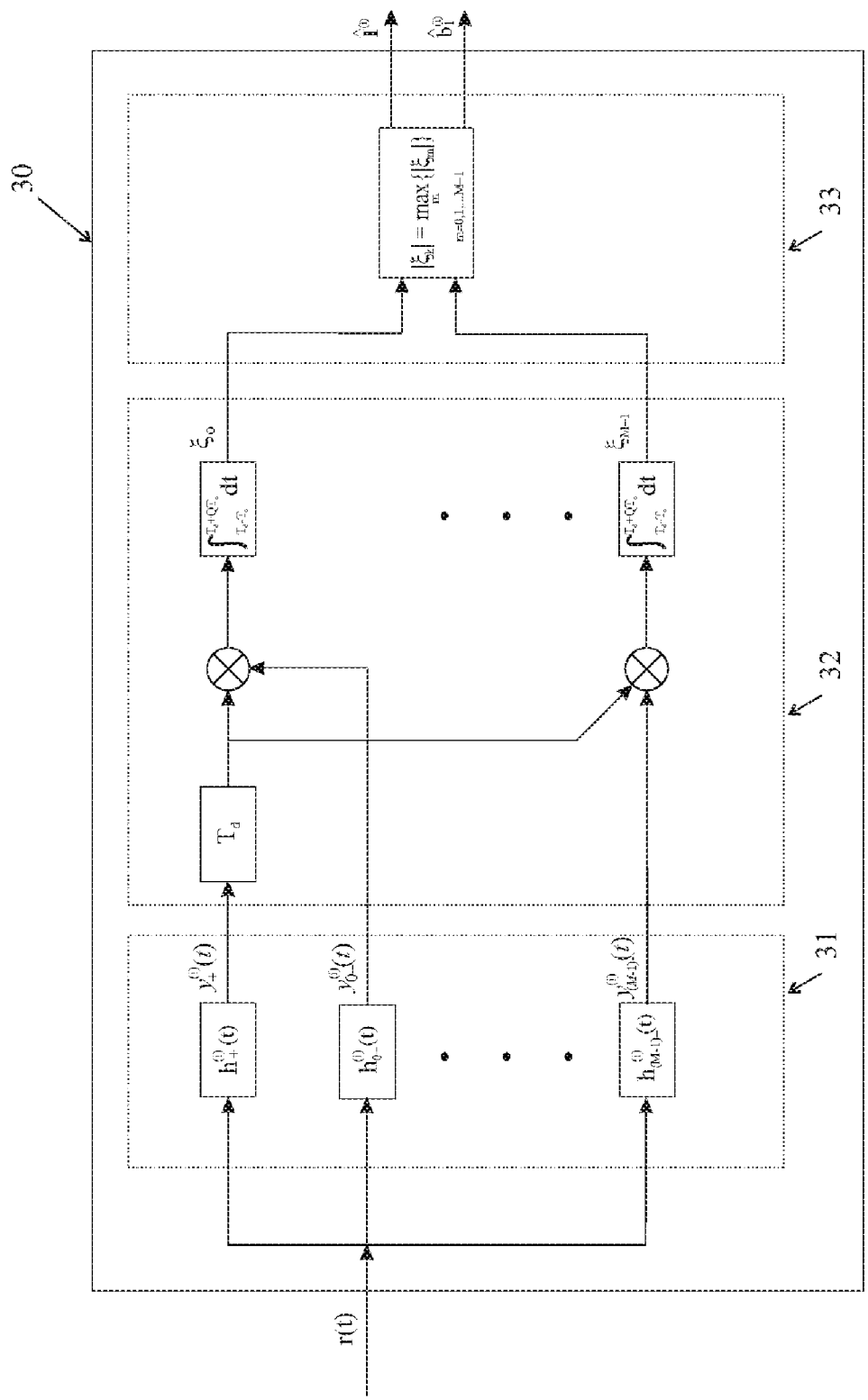
FIG. 3 is a block diagram of the receiver.

The receiver 30 has three modules as shown in FIG. 3: matched filter bank 31, delay-multiplier-integrator 32, comparator-decoder 33. The received signal first passes through the matched filter bank 31, whose impulse responses are matched to the template signals for the ith symbol given by $$h_+^{(i)}(t) = \frac{1}{\sqrt{N_s}} \sum_{j=iN_s}^{(i+1)N_s-1} w_{rec}(t - jT_f) \qquad (6)$$

$$h_{m-}^{(i)}(t) = \frac{1}{\sqrt{N_s}} \sum_{j=iN_s}^{(i+1)N_s-1} c_{j-iN_s}^m w_{rec}(t - jT_f), m = 0, 1, \ldots, M-1. \qquad (7)$$

The corresponding matched filter outputs can be expressed as $$y_+^{(i)}(t) = \int_{-\infty}^{+\infty} r(\tau) h_+^{(i)}(\tau - t) d\tau \qquad (8)$$

$$y_{m-}^{(i)}(t) = \int_{-\infty}^{+\infty} r(\tau) h_{m-}^{(i)}(\tau - t) d\tau, m = 0, 1, \ldots, M-1 \qquad (9)$$

At the delay-multiplier-integrator 32, $y_+^{(i)}(t)$ is delayed by $T_d$, multiplied with $y_{m-}^{(i)}(t)$ and then integrated over a certain time interval to yield M decision variables, given by $$\xi_m = \int_{T_d - T_c}^{T_d + QT_c} y_+^{(i)}(t - T_d) y_{m-}^{(i)}(t) dt, m = 0, 1, \ldots, M-1 \qquad (10)$$

with $0 \leq QT_c \leq T_m$ to collect most of the signal energy spreaded over all the MPCs. Based on the assumption $T_f > T_d + T_m$, only the waveforms in the first frame of the matched filter outputs are of interest.

The comparator-decoder 33 compares the decision statistics $\{\xi_m | m=0, 1, \ldots, M-1\}$, chooses the one with the largest absolute value, denoted by $$|\xi_k| = \max_{0 \leq m \leq M-1} \{|\xi_m|\} \qquad (11)$$

and then decodes the $1 + \log_2 M$ data bits as follows:

$$\hat{I}^{(i)} = (k)_2 \qquad (12)$$

$$\hat{b}_1^{(i)} = \frac{1}{2}[1 + \text{sign}(\xi_k)] \qquad (13)$$

Figure 4:
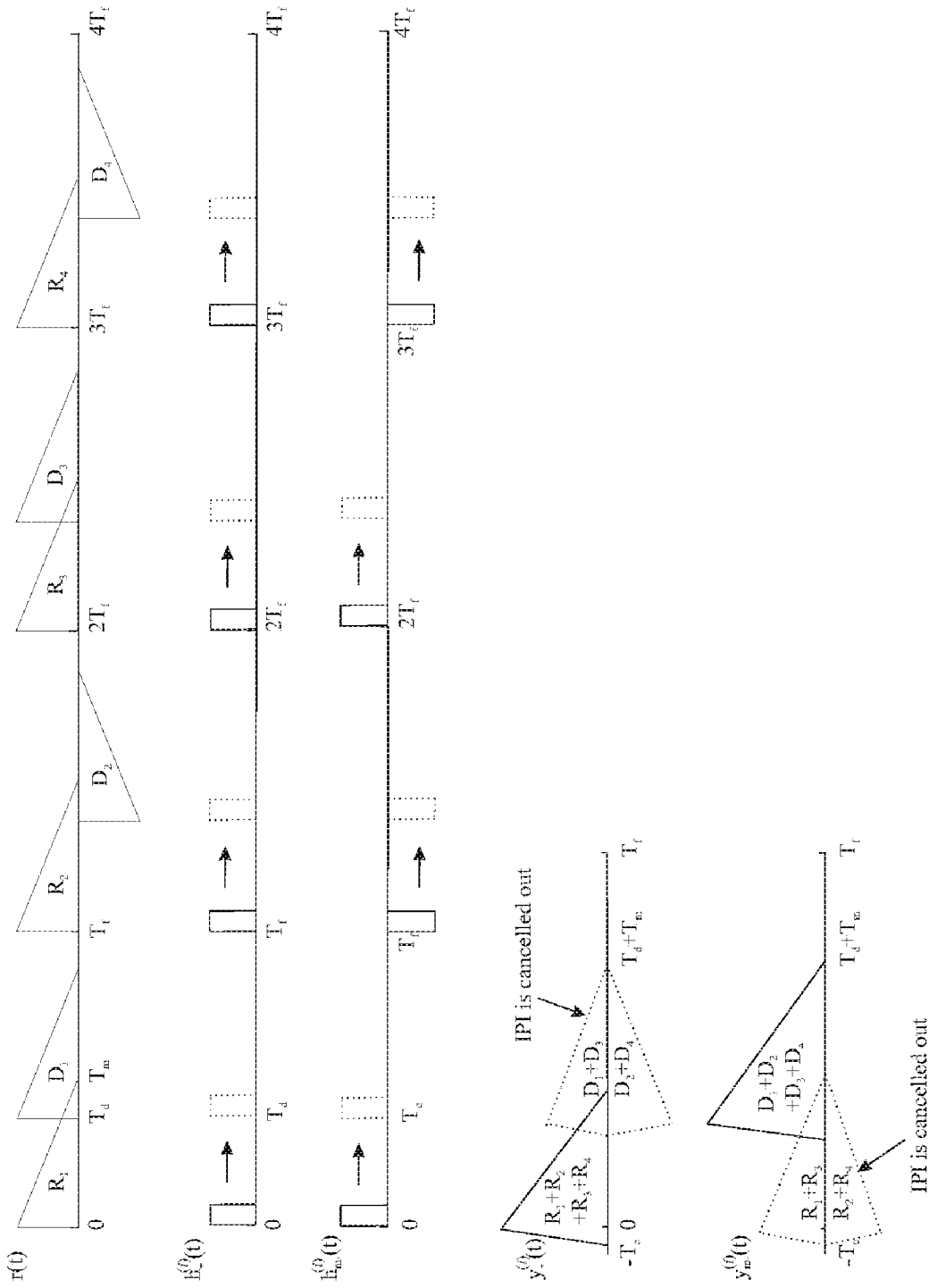
FIG. 4 is a graph illustrating how the IPI is cancelled out using a pair of balanced matched filters.

This receiver structure differs from the conventional TR by introducing additional M matched filters whose impulse responses are also matched to the M-ary orthogonal codes. Especially, by conforming to the above-mentioned two design criterions, the receiver is able to cancel out the IPI resulted from the multipath as well as achieve M-ary orthogonal modulations. The IPI cancellation mechanism is shown in FIG. 4, where we assume $N_s = 4$, $C^m = (1, -1, 1, -1)$ and $b_1^{(i)} = 1$ have been used. $R_n$ and $D_n$ represent the received reference and data waveforms in the nth frame, respectively. As can be seen in the first sub-figure, the tail portion of each reference waveform is overlapped with the corresponding data waveform. The filtering process is shown in the second and third sub-figures. As the template signals $h_+^{(i)}(t)$ and $h_{m-}^{(i)}(t)$ are shifted and correlated with the received waveform, there will be IPIs occurred in the filter outputs $y_+^{(i)}(t)$ and $y_{m-}^{(i)}(t)$, respectively, shown as dotted lines in the last two sub-figures. However, it is easy to find that due to the adoption of the code sequence $C^m$ with equal numbers of +1 and −1, the IPIs in $N_s$ frames are added destructively, thus fully cancelled out. Note that, in order to perfectly eliminate the IPI, the multipath channel (5) is assumed to be at least invariant over one symbol duration.

Figure 5:
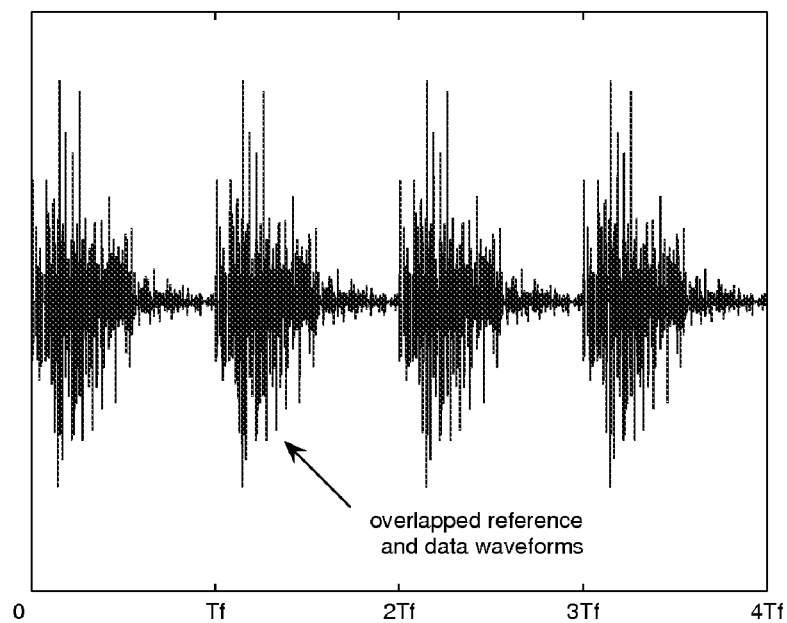
FIGS. 5 and 6 are graphs showing the noise-free received signal where the reference and data waveforms are overlapped, in the conventional and the invented TR systems, respectively.
Figure 6:
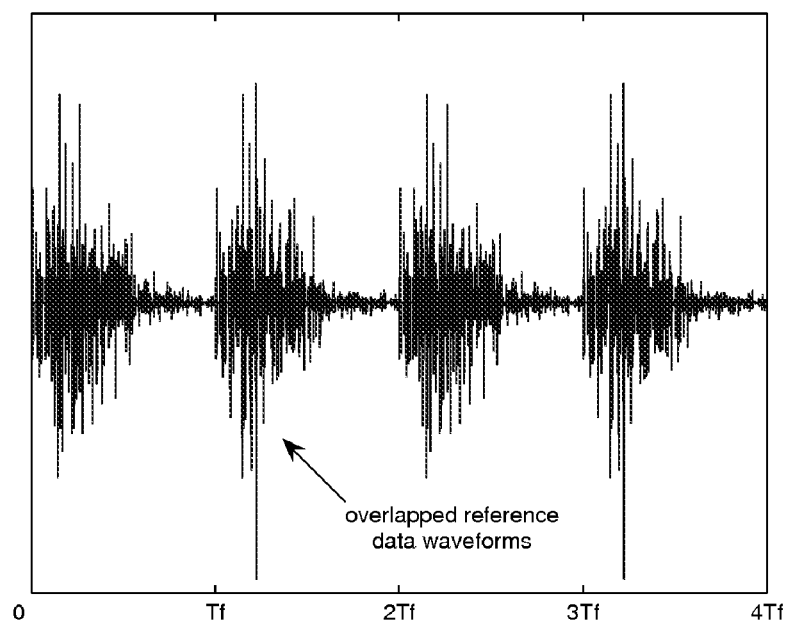
Figure 7:
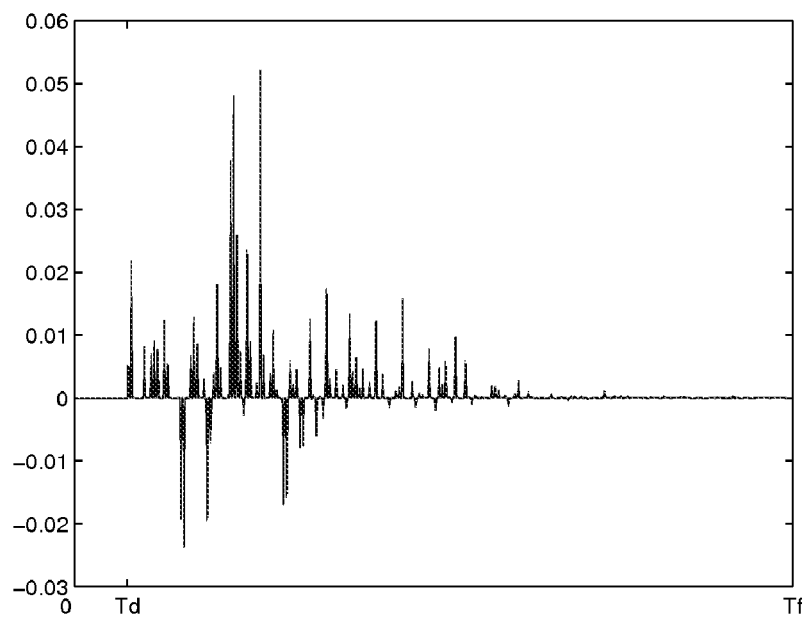
FIGS. 7 and 8 are graphs showing the inputs to the integrators obtained from the signals of FIGS. 5 and 6, in the conventional and the invented TR systems, respectively.
Figure 8:
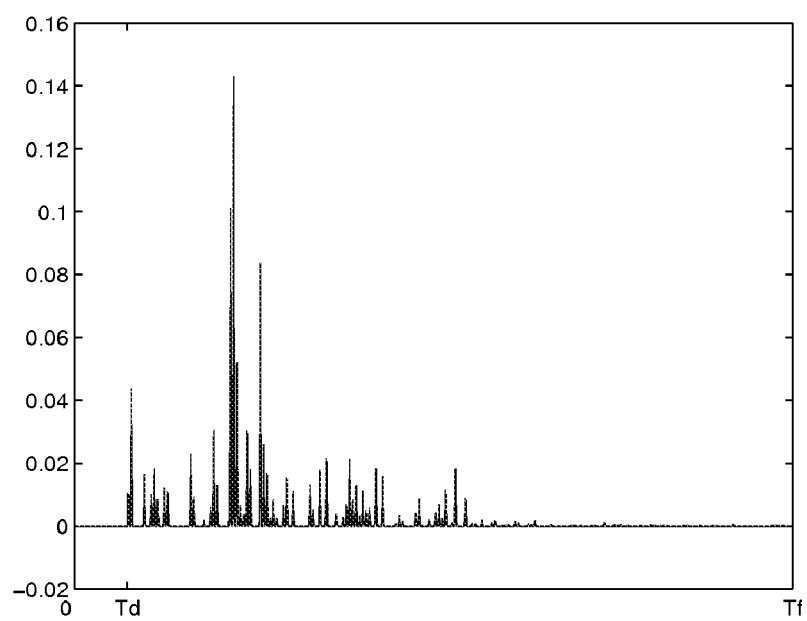

To better examine the IPI cancellation mechanism and compare with the conventional TR system, FIGS. 5 and 6 show two exemplary noise-free received waveforms for the conventional and the invented TR systems, respectively, using the same parameters as in FIG. 4. Note that in the convention TR system, no orthogonal code is used and there is only one matched filter which is matched to $h_+^{(i)}(t)$. The outputs of the multipliers, which are also the inputs to the correlators, in both systems are shown in FIGS. 7 and 8, respectively. It can be seen that in the invented TR system, the MPCs share the same polarity determined by $b_1^{(i)}$, thus can be coherently integrated for detecting the data; while the conventional TR system suffers from the IPI and leads to non-coherently integrating the MPCs with different polarities.

In summary, each of these M matched filters $\{h_{m-}^{(i)}(t) | m=0, 1, \ldots, M-1\}$, coupled with $h_+^{(i)}(t)$, forms a pair of said balanced matched filters. The mth pair of balanced matched filters is able to eliminate the IPI for the signals that have been transmitted using the code $C^m$. Furthermore, due to the orthogonality among different codes, the outputs of other matched filters, which are not matched to the code used by the transmitter, simply become zero. This enables the M-ary orthogonal modulation. As mentioned early, if M=1 is used, no additional data bit will be sent. However, we still use a fixed code which meets the first design criterion for enabling the IPI cancellation mechanism. This special embodiment of the invention is referred to as Balanced TR system, as compared to M-ary orthogonal/Balanced TR system.

To compare the performance of the invented TR system with that of the conventional TR system, we investigate their BER performances. To make a fair comparison, the energy used to transmit one bit information, denoted by $E_b$, is same for both systems. The received pulse is assumed to be the second order derivative of a Gaussian monocycle given by $$w_{rec}(t) = (1 - 4\pi(t/\tau_m)^2) \exp(-2\pi(t/\tau_m)^2), \qquad (14)$$

where $\tau_m$ 0.0686 ns, resulting in a pulse width (chip time) $T_w = 0.167$ ns. For the orthogonal code set, we have used Walsh sequences, excluding the all-one sequence which does not meet the first design criterion. The continuous-time channel model that generates the arrival times and the channel gain coefficients of all the MPCs follows the IEEE 802.15.3a indoor wireless channel models, which are specifically designed for the physical layer analysis of high data rate UWB systems. For different channel models, e.g. line-of-sight (LOS) and non-line-of-sight (NLOS), L will differ according to different channel delay spreads. Without loss of generality, we choose the channel model CM1, which represents a LOS channel model. $LT_c$ is chosen to be 200 chips, equivalent to a channel delay spread around 33 ns. We have chosen the integration interval $QT_c=50$ chips to collect enough signal energy as well as not to accumulate too much noise energy. Note that this value can be further optimized depending on different input SNR values so as to generate a maximum output SNR. In all simulations, the frame length satisfies $T_f=T_d+T_m+T_c$ as the minimum requirement to ensure there is no IFI between adjacent frames. As a result, different values of $T_d$ result in different frame lengths, thus different data rates.

Figure 9:
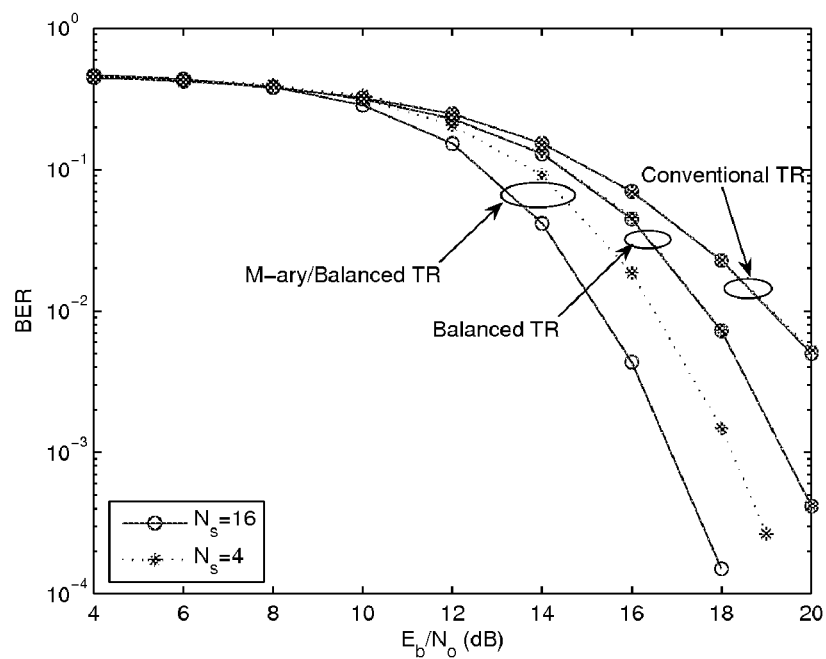
FIG. 9 is a graph comparing the BER performances of M-ary orthogonal coded/Balanced TR, Balanced TR and the conventional TR systems at one specific data rate.

FIG. 9 shows the BER performances of M-ary orthogonal coded/Balanced TR system, Balanced TR system and the conventional TR system for $\{N_s\ 4, M=2\}$ and $\{N_s\ 16, M=4\}$, respectively. In this figure, $T_d$ is chosen to be 16 chips. Compared to the channel delay spread $T_m$ 200 chips, the received reference and data waveforms will be severely overlapped. As can be seen from FIG. 9, both M-ary orthogonal coded/Balanced TR system and Balanced TR system provide better BER performances than the conventional TR system over the entire SNR region, except that M-ary orthogonal coded/Balanced TR system performs worse than the other two at the low SNR range (<6 dB) due to high order modulations. Specifically, the Balanced TR offers about 1.5 dB gain in SNR per bit $E_b/N_o$ over the conventional TR system for both $\{N_s=4, M=2\}$ and $\{N_s=16, M=4\}$ when a BER of $10^{-2}$ has to be achieved, while M-ary orthogonal coded/Balanced TR system provides additional 1 dB and 2 dB gains for the two cases, respectively. It is worth noting that the BER performances of the conventional TR and the Balanced TR do not improve when we increase $N_s$ from 4 to 16, if the same amount of energy is used to transmit one bit information. However, for the M-ary orthogonal coded/Balanced TR system, this improvement is significant, which indicates it is more suitable for high-data-rate communications.

Figure 10:
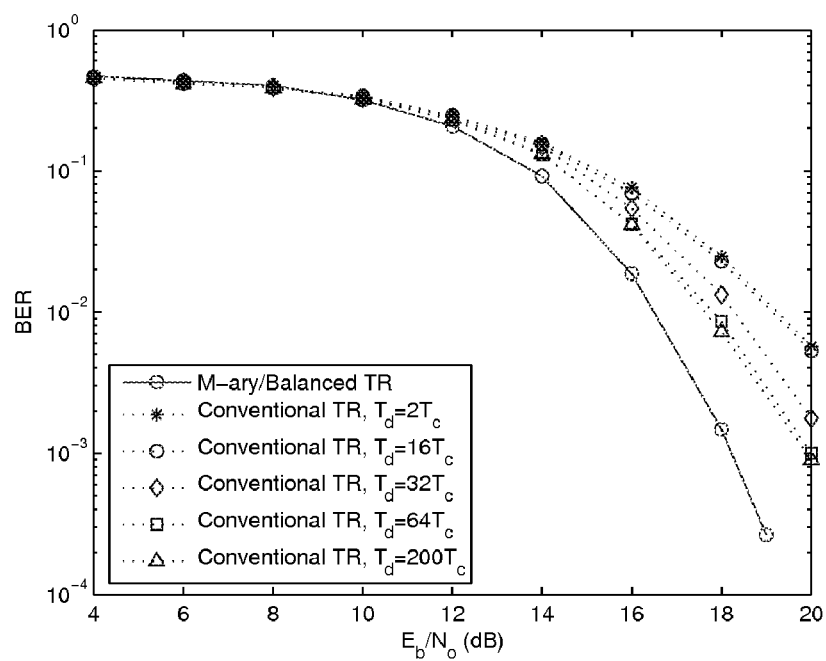
FIGS. 10 and 11 are graphs comparing the BER performances of M-ary orthogonal coded/Balanced TR and the conventional TR systems at various data rates.
Figure 11:
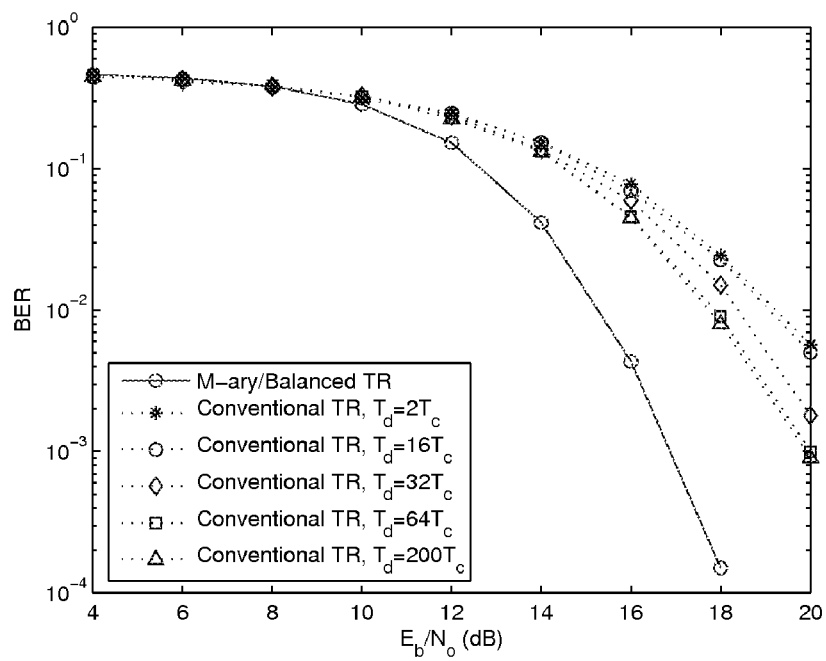

FIGS. 10 and 11 give the BER comparison between the M-ary orthogonal coded/Balanced TR system and the conventional TR system for $\{N_s=4, M=2\}$ and $\{N_s=16, M=4\}$ respectively, at different data rates, indicated by different $T_d$ values. Again, the superior BER performance of the M-ary orthogonal coded/Balanced TR system is observed. Since the invented system is not subject to the IPI, the BER performances at different data rates are same and the BER curves overlap with each other. Therefore, we only presented one such curve in both figures. On the other hand, the BER performance of the conventional TR system degrades as $T_d$ gets smaller, as shown in FIGS. 10 and 11. The reason is the shorter the separation between the reference and data pulses, the larger the IPI is, since the MPCs arriving earlier usually carry more energy. This performance degradation means that the conventional TR system is susceptible to the IPI, which further emphasizes the merits of the invented system.

Figure 12:
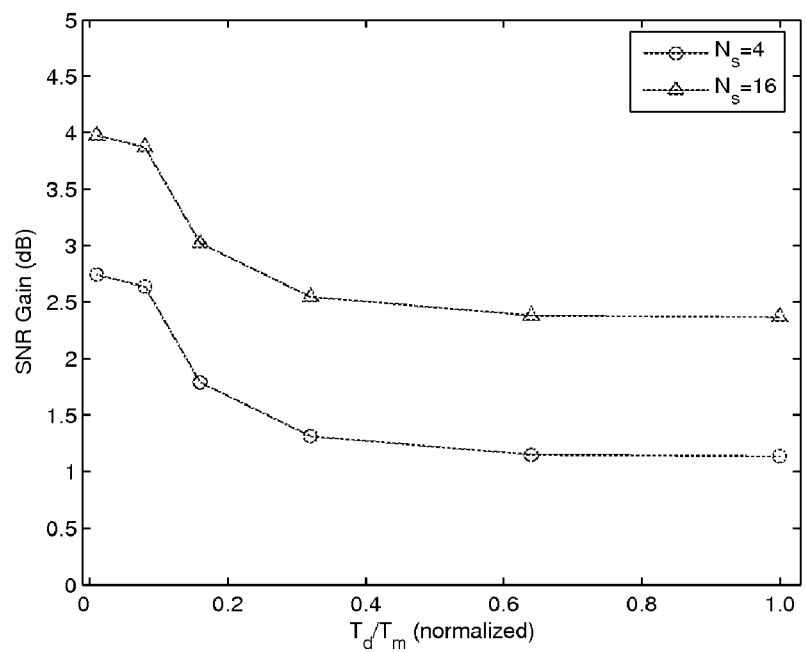
FIG. 12 is a graph showing the SNR gain of M-ary orthogonal coded/Balanced TR system over the conventional TR system, subject to the same BER constraint, at various data rates.

As can be seen from FIGS. 10 and 11, when the two systems, i.e., M-ary orthogonal coded/Balanced TR system and the conventional TR system, operate at the same data rate, the former always provides certain amount of SNR gain (resulting in lower transmit power), given that a certain BER level has to be achieved. FIG. 12 shows this SNR gain of the M-ary orthogonal coded/Balanced TR system over the conventional TR system for $\{N_s=4, M=2\}$ and $\{N_s=16, M=4\}$ at various data rates, subject to a specified BER of $10^{-2}$. As can be seen, the higher the data rates, the more SNR gain can be achieved by the invented TR system.

The simulation results presented above well demonstrate the superior performance of the invented TR system over the conventional TR system. Note that this performance improvement is achieved with only slightly increased transceiver complexity. Specifically, only an additional encoder is needed at the transmitter. At the receiver, M additional matched filters are needed. However, even with a small M, e.g., M=2 or M=4, the invented system has already achieved significant performance improvement. Compared to the prior art TR system dealing with the IPI, e.g., maximum-likelihood template estimator, the invented system has a much lower complexity and requires less processing time.

The M-ary orthogonal coded/Balanced TR system can also be easily generalized to support multiple access (MA) communications, by introducing an additional timing shift determined by a user-specific pseudorandom sequence, known as time hopping (TH) in the prior art. In the invented system, the effective frame length $T_f$ can be significantly increased to maintain a certain data rate. A larger frame length increases the size of TH code set, thus leads to increased MA capability. The MA capability can be further increased by using distinct separations between the reference and data pulses for different users. This results in the alignment between the reference and data waveforms only for the desired receiver and thus reduces other users' interferences.

While this invention is designed based on the conventional TR system which modulates the information bit using the relative polarity between the reference and data pulses, it can be applied to other conventional TR systems which modulate the information bit using the position of the data pulse relative to the nominal time interval between the reference and data pulses. Employing the M-ary orthogonal coded/Balanced TR to these systems based on the above description is straightforward. Similar advantages of the invented system, including increased data rate and better BER performance, can be expected.

V. CLAIMS

While this invention has been described with reference to illustrative embodiments, this description is not intended to be construed in a limiting sense. Many modifications and changes will occur to those skilled in the art. Therefore, it should be understood that the invention is to cover all modifications, equivalents, and alternatives falling within the spirit and scope of the invention as defined by the following appended claims:

What is claimed is:

1. An M-ary orthogonal coded/Balanced transmitted reference (TR) system for ultra wideband (UWB) communications, comprising:
   encoding data bits using M-ary orthogonal codes,
   generating a transmission signal according to the encoded data bits, using pairs of pulses separated by a time interval $T_d$, each pair of pulses comprising an un-modulated first reference pulse and a second data pulse modulated by the encoded data bits,
   transmitting the transmission signal over a communication channel;
   receiving the transmission signal and balance-matched filtering the received transmission signal using a bank of (M+1) filters, where a first filter is matched to a received reference pulse of the transmission signal, while remaining M filters are matched to a received data pulse weighted by the M-ary orthogonal codes, respectively, delaying and correlating an output of the first filter with outputs of the remaining M filters, giving M correlated outputs, and decoding the encoded data bits based on the largest of the M correlated outputs.

2. The system of claim 1 further including the step of controlling a rate in which data is processed by the M-ary orthogonal coded/Balanced transmitted reference (TR) system by altering a number of M-ary orthogonal codes.

3. The system of claim 1 further including the step of controlling a rate in which data is processed by the M-ary orthogonal coded/Balanced transmitted reference (TR) system by altering the time interval between the reference and data pulses.

4. The system of claim 1 further including the step of controlling a rate in which data is processed by the M-ary orthogonal coded/Balanced transmitted reference (TR) system by altering a length of frame time.

5. The system of claim 1 further including the step of controlling a rate in which data is processed by the M-ary orthogonal coded/Balanced transmitted reference (TR) system by altering the number of pairs of pulses per transmission signal.

6. The system of claim 1 further including the step of controlling a bit error rate in which data is processed by the M-ary orthogonal coded/Balanced transmitted reference (TR) system by altering a number of M-ary orthogonal codes.

7. The system of claim 1 further including the step of controlling a bit error rate in which data is processed by the M-ary orthogonal coded/Balanced transmitted reference (TR) system by altering a length of frame time.

8. The system of claim 1 further including the step of controlling a bit error rate in which data is processed by the M-ary orthogonal coded/Balanced transmitted reference (TR) system by altering the number of pairs of pulses per transmission signal.

9. The system of claim 1 further including the step of controlling a number of matched filters and a number of the correlators.

10. The system of claim 1 further including the step of controlling an integration interval of the correlators to achieve a maximum output signal-to-noise ratio.

11. The system of claim 1 further including the step of shaping the spectrum of the transmitted transmission signal by multiplying a distinct pair of pseudo-random polarity-shift codes with TR pulse pairs.

12. The system of claim 1 further including the step of introducing an additional timing shift determined by a user-specific pseudorandom time hopping (TH) sequence to distinguish among users, based on their unique pulse separation for an enhanced TH multiple access capability.

13. The system of claim 12 further including the step of choosing distinct time intervals between the reference and data pulses for different users.

* * * * *